Feb. 16, 1926.
S. DIEHL
1,573,377
ICE CUTTING, TIMBER FRAMING, AND WOOD SAWING MACHINE
Filed April 22, 1924
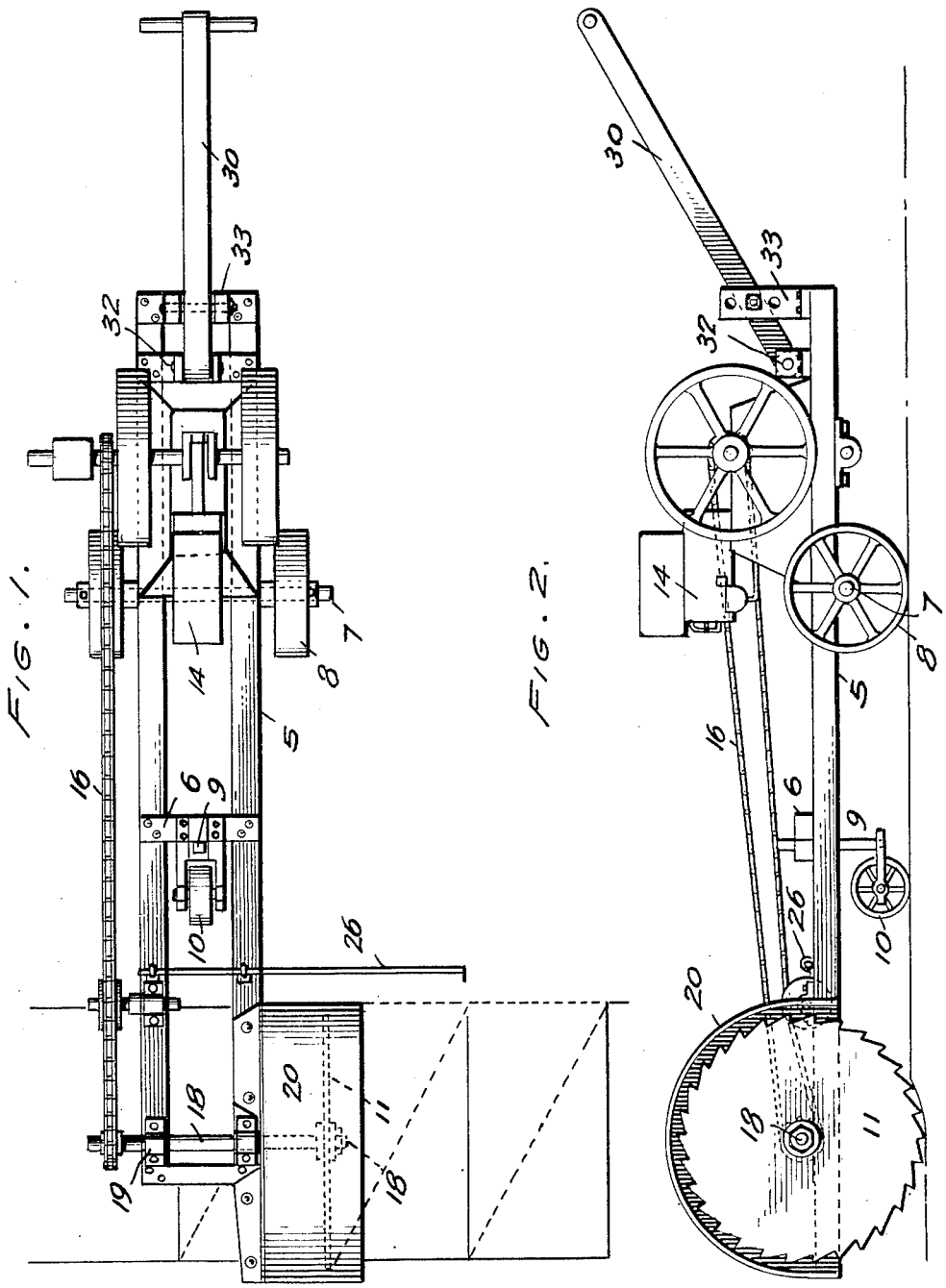
INVENTOR
STANLEY DIEHL
BY Milo B Stevens Co.
ATTORNEYS Patented Feb. 16, 1926.

1,573,377

UNITED STATES PATENT OFFICE.

STANLEY DIEHL, OF BEDFORD, PENNSYLVANIA.

ICE-CUTTING, TIMBER-FRAMING, AND WOOD-SAWING MACHINE.

Application filed April 22, 1924. Serial No. 708,202.

*To all whom it may concern:*

Be it known that I, STANLEY DIEHL, residing at Bedford, in the county of Bedford and State of Pennsylvania, have invented a new and useful Ice-Cutting, Timber-Framing, and Wood-Sawing Machine, of which the following is a specification.

This invention relates to portable ice cutting machines of the motor driven type.

Briefly stated, an important object of the invention is to provide a motor driven portable ice cutting machine which may be controlled from a point remote from previously made cuts and the cuts being made so that the operator will not be in danger of falling through weakened ice.

Also an object of the invention is to provide a portable ice cutting machine which is adapted to completely sever the ice to avoid that fringe which is so objectionable in ice cut with other known machines.

A further and equally important object of the invention is to provide a portable ice cutting machine which is highly mobile over land and ice and in which the ice cutting saw turns in the direction of travel of the machine to assist substantially in advancing the machine.

Other objects of the invention will be apparent in the course of the following description.

In the accompanying drawing forming a part of this application and in which like numerals are employed to designate like parts throughout the same.

Figure 1 is a plan view of the improved ice cutting machine in use.

Figure 2 is a side elevation of the machine.

In the drawing wherein for the purpose of illustration is shown a preferred embodiment of the invention the numeral 5 designates an elongated frame which may consist of a pair of longitudinally extending beams and suitable cross members 6 by means of which the longitudinally extending beams are connected.

The frame is provided with a suitably supported axle 7 upon which the main wheels 8 are rotatably mounted and one of the cross beams 6 is provided with a spindle 9 to which a gage wheel 10 is connected. At this point it might be stated that the gage wheel 10 cooperates with the main wheels 8 in rendering the machine highly mobile over land and ice. The gage wheel 10 may be adjusted vertically with respect to the frame so as to control the cutting depth of the saw designated by the numeral 11.

A motor 14 preferably of the internal combustion engine type is mounted on the forward portion of the frame and is connected by a chain 16 or other suitable mechanism with a cross shaft 18 at the rear end of the machine. Figure 1 clearly illustrates that suitable bearings 19 are employed to secure the shaft in place.

In carrying out the invention the saw 11 is mounted upon the shaft 18 and a substantially semi-circular hood 20 is extended over the saw and is secured in any suitable manner to the frame of the machine. It will be seen that the hood 20 acts as a guard for safety purposes and also prevents the cuttings from being splashed into the air and possibly on the operator.

Particular attention is directed to Figure 1 which plainly illustrates that the shaft 18 extends a substantial distance beyond one side of the frame 5 so that a cut substantially parallel to the axis of the machine may be made, during which the machine and the operator will remain on uncut ice.

A gage rod 26 is secured to the frame and extends beyond one side of the same to aid the operator in making cuts the proper distance apart.

In operation the person controlling the machine grasps the handle 30 from the forward end of the machine and moves the machine to a position where the cuts are to be made. At this point it might be stated that the handle 30, which is pivoted as indicated at 32, is adjustably connected to the bracket 33 and may be inclined to the desired extent in accordance with the height of the operator. It will be seen that the machine may be tilted about the axis of the shaft 7 to hold the saw 11 out of engagement with the ice or the ground when the machine is being moved. When the saw has been properly positioned for cutting the ice it is merely necessary to lower the rear portion of the frame somewhat so that the saw is engaged with the ice and the gage wheel 10 brought to rest on the ice. As previously stated the gage wheel 10 holds the machine in a predetermined position so that the saw will make a complete cut through the ice and will not extend an objectionable distance into the water. Of course, if the saw extends an objectionable distance into the water power is uselessly expended and the speed of the saw is cut down. However, the saw is allowed to cut completely through the ice to avoid that fringe which is so common with ice cut from frozen ponds, lakes and the like.

When the initial cut in the ice has been completed the operator may proceed to make a series of parallel cuts at right angle to the initial cut in the manner shown in the Figure 1 whereby the ice is properly severed. That is to say, it is cut on three sides and to completely sever the ice it is merely necessary to swing the machine around parallel to the first or initial cut and completely sever the blocks.

A machine constructed in accordance with this invention is safe to operate as the operator and machine are at all times able to remain on uncut ice and as the machine is extremely light it is not likely to fall through thin ice upon which ice cutting machines are frequently compelled to operate.

The machine is also especially useful in cutting wood.

I claim:

A portable ice cutting machine comprising an elongated frame, an ice cutting saw carried by the rear end of the frame and spaced to one side thereof, a motor on the forward portion of the frame and having connection with said ice cutting saw to turn the same in the direction of travel of the machine whereby the saw assists substantially in advancing the machine from the rear end thereof, a pair of wheels beneath the intermediate portion of the frame and supporting the machine for movement about a horizontal axis, a gage wheel between the first-named wheels and the saw to hold the machine in a predetermined position and cooperating with the first-named wheels in rendering the machine mobile over land and ice, and an operator's handle at the forward end of the machine for guiding the machine and tilting the same from a position on the uncut ice.

STANLEY DIEHL.